United States Patent
Toyota

(10) Patent No.: US 6,993,867 B2
(45) Date of Patent: Feb. 7, 2006

(54) RAT EXTERMINATING ELECTROSHOCK SHEET, AND METHOD OF EXPELLING HARMFUL BIRDS AND ANIMALS

(76) Inventor: Junzo Toyota, 4-2-701, Uhigaoka-cho, Tennoji-ku, Osaka-shi, Osaka, 543-0075 (JP)

( * ) Notice: Subject to any disclaimer, the term of this patent is extended or adjusted under 35 U.S.C. 154(b) by 0 days.

(21) Appl. No.: 10/468,836

(22) PCT Filed: Apr. 23, 2001

(86) PCT No.: PCT/JP01/03480

§ 371 (c)(1),
(2), (4) Date: Sep. 2, 2003

(87) PCT Pub. No.: WO02/089570

PCT Pub. Date: Nov. 14, 2002

(65) Prior Publication Data

US 2004/0093788 A1 May 20, 2004

(51) Int. Cl.
*A01M 19/00* (2006.01)
*A01M 23/38* (2006.01)

(52) U.S. Cl. .............. 43/98; 43/99; 43/124; 361/232; 49/59

(58) Field of Classification Search .......... 43/98, 43/99, 124; 361/232; 114/361; 49/59
See application file for complete search history.

(56) References Cited

U.S. PATENT DOCUMENTS

| | | | | |
|---|---|---|---|---|
| 3,388,497 A | * | 6/1968 | Levine | 43/98 |
| 3,392,247 A | * | 7/1968 | Check | 200/86 R |
| 4,037,352 A | * | 7/1977 | Hennart et al. | 43/129 |
| 4,274,123 A | * | 6/1981 | Rogers, Jr. | 361/232 |
| 4,453,196 A | * | 6/1984 | Herr | 361/232 |
| 4,949,216 A | * | 8/1990 | Djukastein | 361/232 |
| 5,027,547 A | * | 7/1991 | Livshin | 43/124 |
| 5,049,704 A | * | 9/1991 | Matouschek | 174/261 |
| 5,107,620 A | * | 4/1992 | Mahan | 43/112 |
| 5,732,503 A | * | 3/1998 | Cheng | 43/112 |
| 5,967,084 A | * | 10/1999 | Klemantaski | 119/234 |
| 6,341,444 B1 | * | 1/2002 | Cina et al. | 43/98 |
| 6,519,131 B1 | * | 2/2003 | Beck | 361/232 |
| 2002/0092481 A1 | * | 7/2002 | Spooner | 119/908 |

FOREIGN PATENT DOCUMENTS

| | | | |
|---|---|---|---|
| FR | 610704 | * | 6/1926 |
| JP | 47-51069 | | 12/1972 |

(Continued)

OTHER PUBLICATIONS

English Language Abstract of JP 2-145143.

(Continued)

Primary Examiner—Peter M. Poon
Assistant Examiner—David J. Parsley
(74) Attorney, Agent, or Firm—Greenblum & Bernstein, P.L.C.

(57) ABSTRACT

A sheet for exterminating rats by electric shock includes two plastic sheets in the form of upper and lower layered sheets. A grid-type copper foil pattern of straight lines with a fixed width, intersecting at right angles, is formed as first electrodes on the upper surface of the upper sheet, and windows are opened through rectangular areas surrounded by the copper foil pattern. A copper foil pattern is formed as second electrodes on the upper surface of the lower sheet, and has the same pattern as the copper foil pattern formed on the upper surface of the upper sheet. The upper sheet and the lower sheet are layered on each other so that the intersecting points in the copper foil pattern formed on the upper surface of the lower sheet are placed at the centers of the windows.

6 Claims, 15 Drawing Sheets

FOREIGN PATENT DOCUMENTS

| | | |
|---|---|---|
| JP | 48-10184 | 3/1973 |
| JP | 60-47629 | 3/1985 |
| JP | 61133532 | 8/1986 |
| JP | 63167733 | 7/1988 |
| JP | 2-56899 * | 2/1990 |
| JP | 2-145143 | 6/1990 |
| JP | 6-181674 | 7/1994 |
| JP | 7-236403 | 9/1995 |
| WO | WO 79/00574 * | 8/1979 |

OTHER PUBLICATIONS

English Language Abstract of JP 6-181674.
English Language Abstract of JP 7-236403.

* cited by examiner

RAT EXTERMINATING ELECTROSHOCK SHEET, AND METHOD OF EXPELLING HARMFUL BIRDS AND ANIMALS

TECHNICAL FIELD

The present invention relates to apparatuses and methods for getting rid of animals which are harmful to humans, particularly to sheets for exterminating rats by electric shock, and methods for repelling bird pests and animal pests from a target place or capturing them alive.

BACKGROUND ART

There are animals which do harm to humans or destruct environment including rats, bird pests such as pigeons, and animal pests such as wild boars.

As a conventional method for exterminating rats, an extermination apparatus using high-voltage electric shock paper has been suggested ("Apparatus for Exterminating Rats by High-Voltage Electric Shock Paper" described in Japanese Published Patent Application S47-51069, and the like). Using a sheet-type insulating waterproof paper on which electric wires made from metal foils or the like are printed and high voltage is applied from one end of each of the electric wires, this apparatus is intended to exterminate rats passing through the paper by giving them an electric shock.

However, this conventional art has the following problems.

Since the electric wires with high voltage being applied are printed in a striped pattern on the electric shock paper, rats may run through insulating portions which are parallel to the electric wires depending on the width of the electric wires or the space between them.

Also, since this electric shock paper employs a system for applying voltage from one end of each of the electric wires which run parallel, it cannot be cut out for use in a shape of cutting those electric wires. Therefore, they must give up laying the paper along a complicated line of a floor such as a floor of a room where a post juts out or a heavy thing such as a chest is placed.

Further, since rats with learning ability have learned that the electric shock paper is dangerous, just a repeated use of this electric shock paper reduces the extermination effect drastically.

On the other hand, due to bird pests such as pigeons, buildings and parks suffer from their droppings, trash is scattered by their foraging trash cans and trash bags, and residents of a town are bothered by noise pollution of their cries. Further, animal pests such as deer, wild boars and kangaroos cause serious crop damage. Therefore, an arrival of an effective method for repelling these bird pests and animal pests from a target place or capturing them alive has been long awaited.

Accordingly, the present invention has been conceived in order to protect against the damages to humans and environment caused by these animals, and an object of the present invention is to provide a sheet for exterminating rats by electric shock which is capable of giving rats an electric shock more surely and can be cut in an arbitrary shape for laying. Also, it is another object of the present invention to provide a sheet for exterminating rats by electric shock which can be used repeatedly by giving them no time for learning.

On the other hand, as for bird pests and animal pests, it is an object of the present invention to provide a method for repelling those bird pests and animal pests from a target place without fail. Also, it is another object to capture them alive without fail.

DISCLOSURE OF INVENTION

A sheet for exterminating rats by electric shock according to the present invention comprises first electrodes and second electrodes for applying high voltage, wherein the first electrodes and the second electrodes are alternately arranged in rows both vertically and horizontally in an exposed state on an upper surface of said sheet. For example, this is a sheet for exterminating rats by electric shock having two plastic sheets (an upper sheet and a lower sheet) which are stacked in layers, wherein a copper foil having a grid-type pattern of straight lines with a fixed width intersecting at right angles is formed on the upper surface of the upper sheet as first electrodes, windows are formed in rectangular areas surrounded by said copper foil pattern, a copper foil pattern which is same as the copper foil pattern formed on the upper surface of the upper sheet is formed on the upper surface of the lower sheet as second electrodes, and the upper sheet and the lower sheet are layered so that the intersecting points in the copper foil pattern on the lower sheet are placed at the centers of the windows. Accordingly, as compared with the conventional art in which parallel electric wires are just printed on electric shock paper, the present invention can give an electric shock to rats running on the sheet with an extremely high probability.

Also, a method for killing rats by electric shock according to the present invention is a method for killing rats by electric shock using the above-mentioned sheet for exterminating rats by electric shock, and comprises the following: when a rat appears while waiting for appearance of the rat under a light-out condition in a room equipped with a lighting apparatus where the sheet for exterminating rats by electric shock is laid and a speaker is placed, (i) applying high voltage between the first electrodes and the second electrodes of the sheet for exterminating rats by electric shock; (ii) turning on the light apparatus; and (iii) generating screams of a rat from a speaker by playing back a prerecorded recording medium using a playback apparatus. Accordingly, rats are struck with panic by both sound and light, namely, turning on a light and a rat's screaming, and thus they can have no time to learn that the electric shock sheet is dangerous to them. Therefore, repeated use of the sheet for exterminating rats by electric shock prevents a problem of reducing the extermination effect of the sheet.

Furthermore, a method for repelling bird pests and animal pests according to the present invention comprises outputting sounds obtained by playing a recording medium on which the sounds are recorded toward the bird pest or the animal pest, the sounds including (i) sounds emitted by a natural enemy of the target bird pest or animal pest which are recorded continuously, and (ii) screams of the target bird pest or animal pest which are recorded at regular intervals between the sounds emitted by the natural enemy or in a state of being superimposed on the sounds emitted by the natural enemy. Accordingly, bird pests and animal pests hear both their natural enemies' cries and their own screams, and thus they run away from the place guessing wrong that they are attacked by their natural enemies.

In addition, in the method for repelling bird pests and animal pests according to the present invention, a plurality of wireless speakers are placed in an outdoor place, and when a bird pest or an animal pest appears in the outdoor place, the sounds the bird pest or the animal pest hates are generated, with a source of generating the sounds being changed by operating the plurality of wireless speakers selectively. Accordingly, the source of generating the sounds can be changed so as to follow the bird pests and animal pests, and thus it is possible to lead them to a target place to capture them alive.

BRIEF DESCRIPTION OF DRAWINGS

FIG. 14A is an external view of a wireless speaker 301a or the like. FIG. 14B is a functional block diagram of the wireless speaker 301a or the like.

BEST MODE FOR CARRYING OUT THE INVENTION (First Embodiment)

First, a sheet for exterminating rats by electric shock according to a first embodiment of the present invention will be explained.

Figure 1:
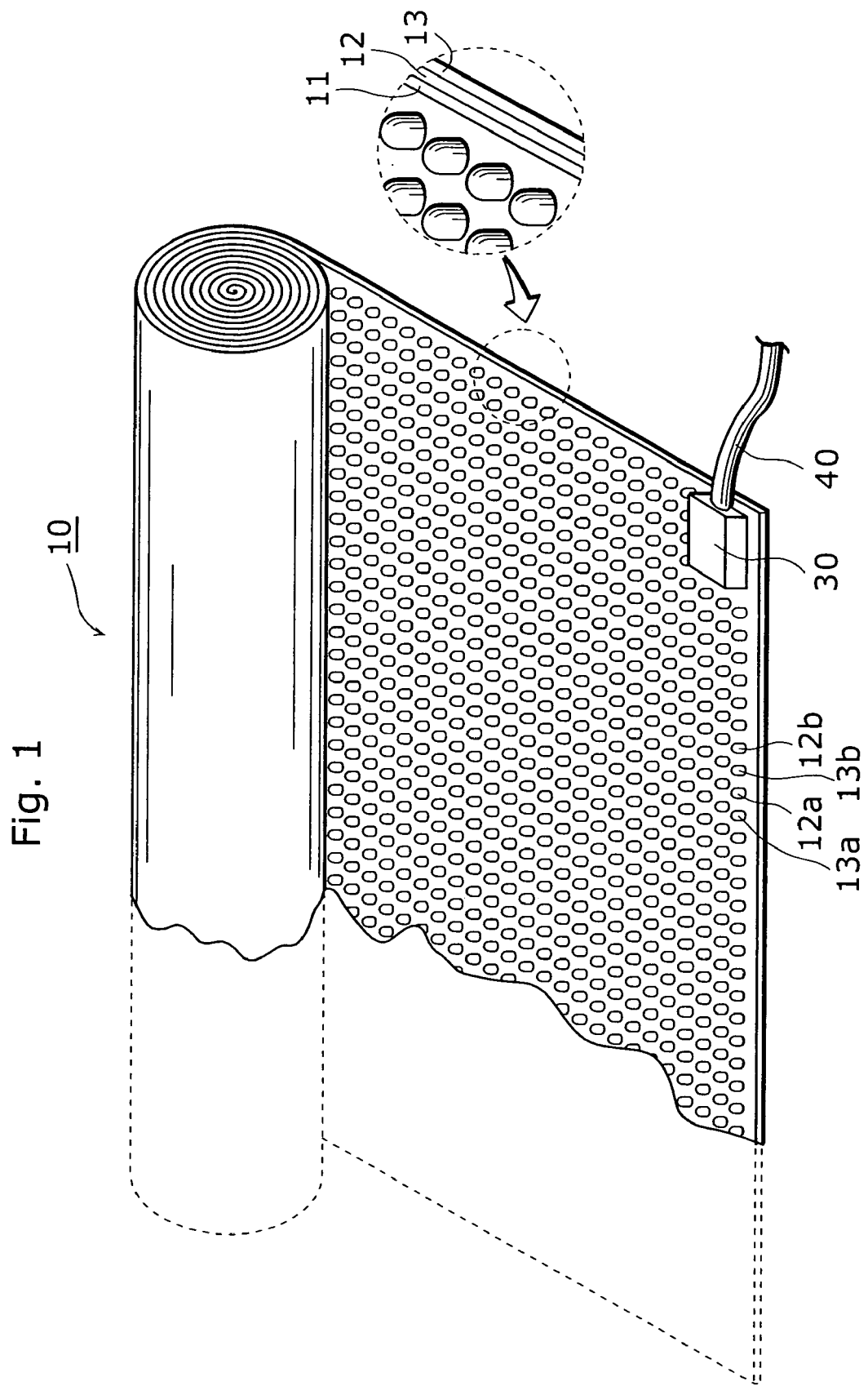
FIG. 1 is an external view of a sheet for exterminating rats by electric shock 10 in a first embodiment of the present invention.

FIG. 1 is an external view of a sheet for exterminating rats by electric shock 10 in the present embodiment.

This sheet for exterminating rats by electric shock 10 is a triple-layered sheet (an upper sheet 11, an intermediate sheet 12 and a lower sheet 13 are stacked in layers) having on its upper surface a plurality of convexes 12a, 13a and others which are arranged densely in rows both vertically and horizontally, and a long sheet of 2 m wide and 10 m long, for example.

Among these convexes 12a, 13a and others, the convexes 12a, 12b and others which are aligned at every other one both vertically and horizontally are formed together with the intermediate sheet 12, and the convexes 13a, 13b and others which are aligned at every other one are formed together with the lower sheet 13. More specifically, the convexes 12a and 12b formed on the intermediate sheet 12 stand on the upper surface of the upper sheet 11 through the round windows thereof, and the convexes 13a and 13b formed on the lower sheet 13 stand on the upper surface of the upper sheet 11 through the round windows of the intermediate sheet 12 and the upper sheet 11.

These three sheets 11~13 are all made of film-like thin plastic sheets or the like, and the upper surfaces (the surfaces including the surfaces of the convexes) of the intermediate sheet 12 and the lower sheet 13 having a plurality of convexes are covered all over with conductive metal films. However, these three sheets 11~13 are electrically insulated from each other. Among the convexes 12a, 12b, 13a and 13b which stand on the upper surface of the sheet for exterminating rats by electric shock 10, the convexes 12a and 12b belonging to the intermediate sheet 12 act as one electrode (a positive electrode, for example) for applying high voltage to rats, while the convexes 13a and 13b belonging to the lower sheet 13 act as another electrode (a negative electrode, for example).

At one corner on the upper surface of the sheet for exterminating rats by electric shock 10, a connector 30 is fastened for applying high voltage supplied via a power cord 40 to a plurality of convexes (between the convexes belonging to the intermediate sheet 12 and the convexes belonging to the lower sheet 13). This connector has in itself female (雌) electrode sockets for engaging with male (凸) electrode pins of respective convexes.

Applying high voltage to the sheet for exterminating rats by electric shock 10 via this connector 30 makes the sheet into the state in which high voltage is applied between all the adjacent two convexes (between the convexes 12a and the convexes 13a, for example) on the sheet for exterminating rats by electric shock 10. Therefore, when a rat steps on this sheet for exterminating rats by electric shock 10, high-voltage positive and negative electrodes come in contact with the rat's limbs with an extremely high probability, and thus the high voltage is applied to the rat without fail, unlike the conventional sheet on which parallel electric wires are printed in rail form.

Figure 2:
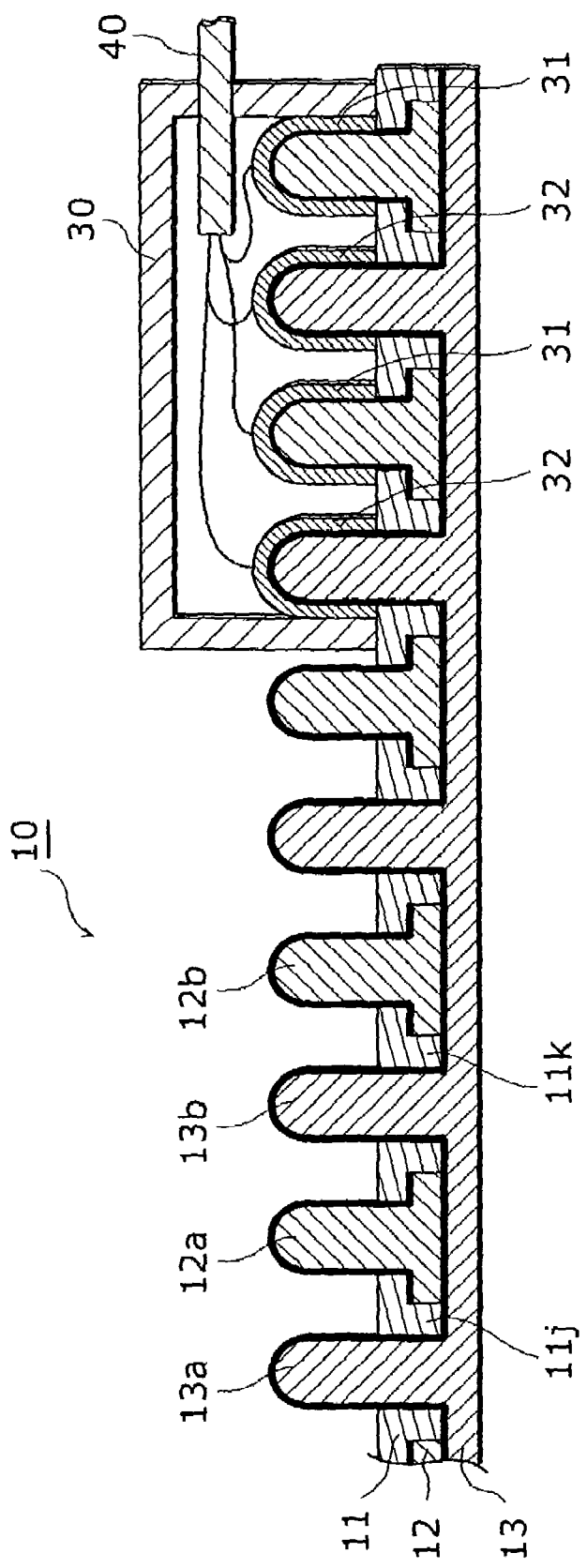
FIG. 2 is a cross sectional view of the sheet for exterminating rats by electric shock 10 as shown in FIG. 1.

FIG. 2 is a cross sectional view of the sheet for exterminating rats by electric shock 10 as shown in FIG. 1, namely, a cross sectional view of the plane joining the convexes 13a, 12a, 13b and 12b which are arranged in a single horizontal line on the front row of the sheet for exterminating rats by electric shock 10 in FIG. 1. Note that in this figure, the metal films which are formed on the upper surfaces of the intermediate sheet 12 and the lower sheet 13 respectively are indicated by heavy lines.

The sizes of the main portions of the sheet for exterminating rats by electric shock 10 as shown in this cross sectional view are as follows. The thickness of the three sheets 11~13 is all about 0.5 mm. Each of the convexes 12a, 13a and others formed on the intermediate sheet 12 and the lower sheet 13 is a cylindrical-shaped element of about 1 mm in diameter with its dome-shaped tip and has a length of about 2 mm standing on the upper sheet 11. The convexes 12a, 13a and others which stand on the upper sheet 11 are formed integrally with the intermediate sheet 12 and the lower sheet 13 so that they are aligned at a spacing of about 2 mm.

In the connector 30, two conducting wires are connected respectively to female electrodes 31 which come in contact with the convexes belonging to the intermediate sheet 12 and female electrodes 32 which come in contact with the convexes belonging to the lower sheet 13.

Figure 3:
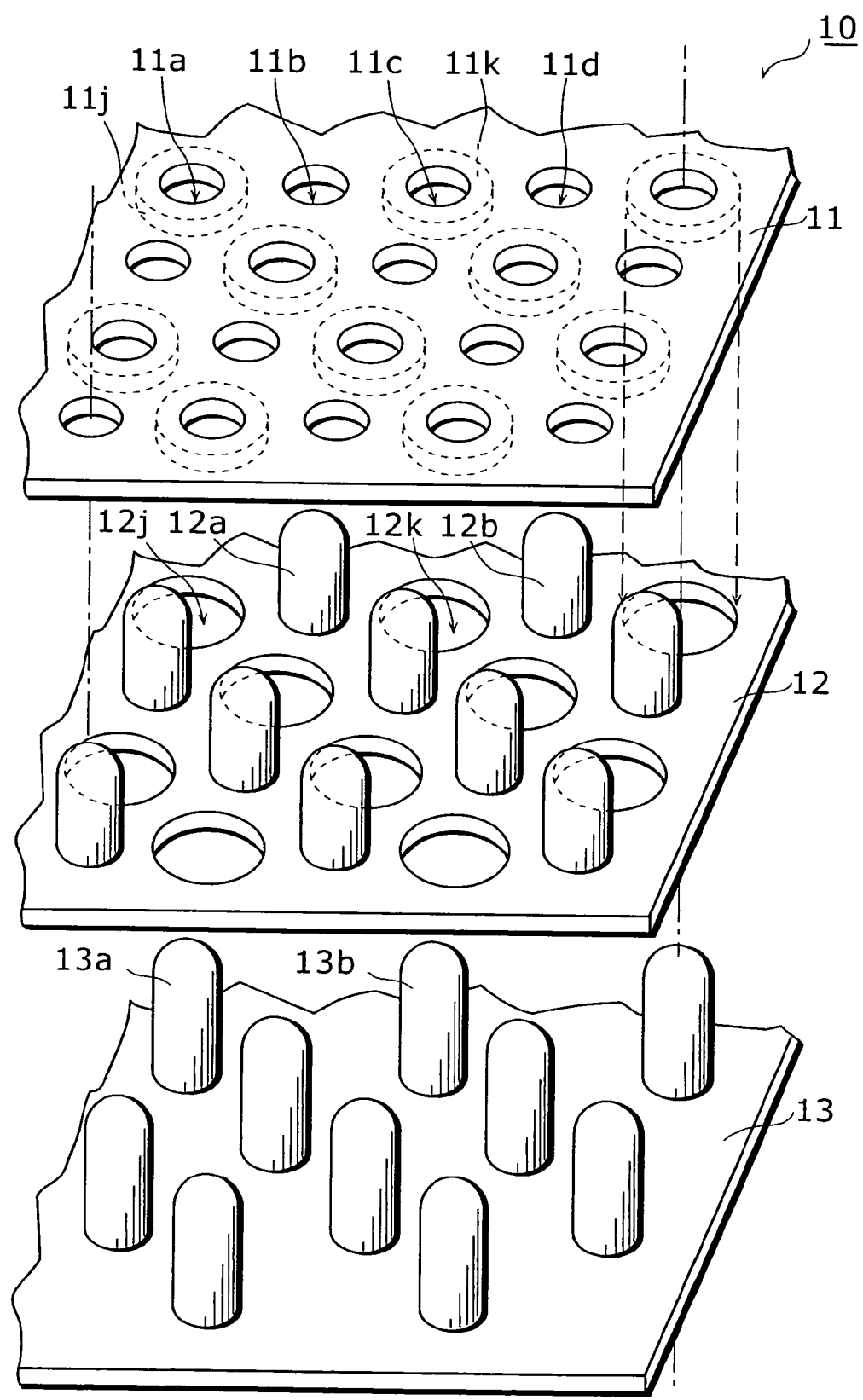
FIG. 3 is a perspective view showing respective shapes of three sheets 11~13 that form the sheet for exterminating rats by electric shock 10.

FIG. 3 is a perspective view showing respective shapes of the three sheets 11~13 that form the sheet for exterminating rats by electric shock 10.

Holes 11a~11d of about 1 mm in diameter are arranged in rows both vertically and horizontally all over the upper sheet 11 at a spacing of about 2 mm. Among these holes 11a~11d, the holes 11a and 11c through which the convexes 13a and 13b on the lower sheet 13 come up has, at the outer edges of the back sides thereof, doughnut-shaped projecting members 11j, 11k and others which function as spacers for keeping the upper surface (the metal film) of the intermediate sheet 12 apart from the surface (the metal film) over the convexes on the lower sheet 13.

Holes 12j, 12k and others into which the projecting members 11j, 11k and others formed on the back side of the upper sheet 11 are inserted are arranged in rows both vertically and horizontally all over the intermediate sheet 12 at a spacing of about 2 mm alternately with the convexes 12a, 12b and others.

On the lower sheet 13, the convexes 13a, 13b and others are arranged in rows both vertically and horizontally at a spacing of about 4 mm so as to come up through the holes 12j, 12k and others of the intermediate sheet 12 and the holes 11a, 11c and others of the upper sheet 11.

Note that conductive metal films are formed (coated or printed) on the upper surfaces of the intermediate sheet 12 and the lower sheet 13 (including the surfaces of the convexes), and the convexes on each surface are electrically short-circuited with each other.

This sheet for exterminating rats by electric shock 10 is manufactured in the following manner.

First, a sheet is formed as a single piece integrally with the projecting members 11j and others and the convexes 12a and others by molding or squeezing a synthetic resin or the like melted into a liquid state.

Then, the upper sheet 11 is completed by making holes by a cutter or the like at a fixed spacing on the sheet obtained as above. The lower sheet 13 is completed by printing a metal film on the sheet with the convexes formed thereon by applying coating of paste or paint including copper powders or evaporating copper, aluminum or the like. The intermediate sheet 12 is completed by making holes by a cutter or the like at a fixed spacing after the same manufacturing process as that of the lower sheet 13.

Figure 4:
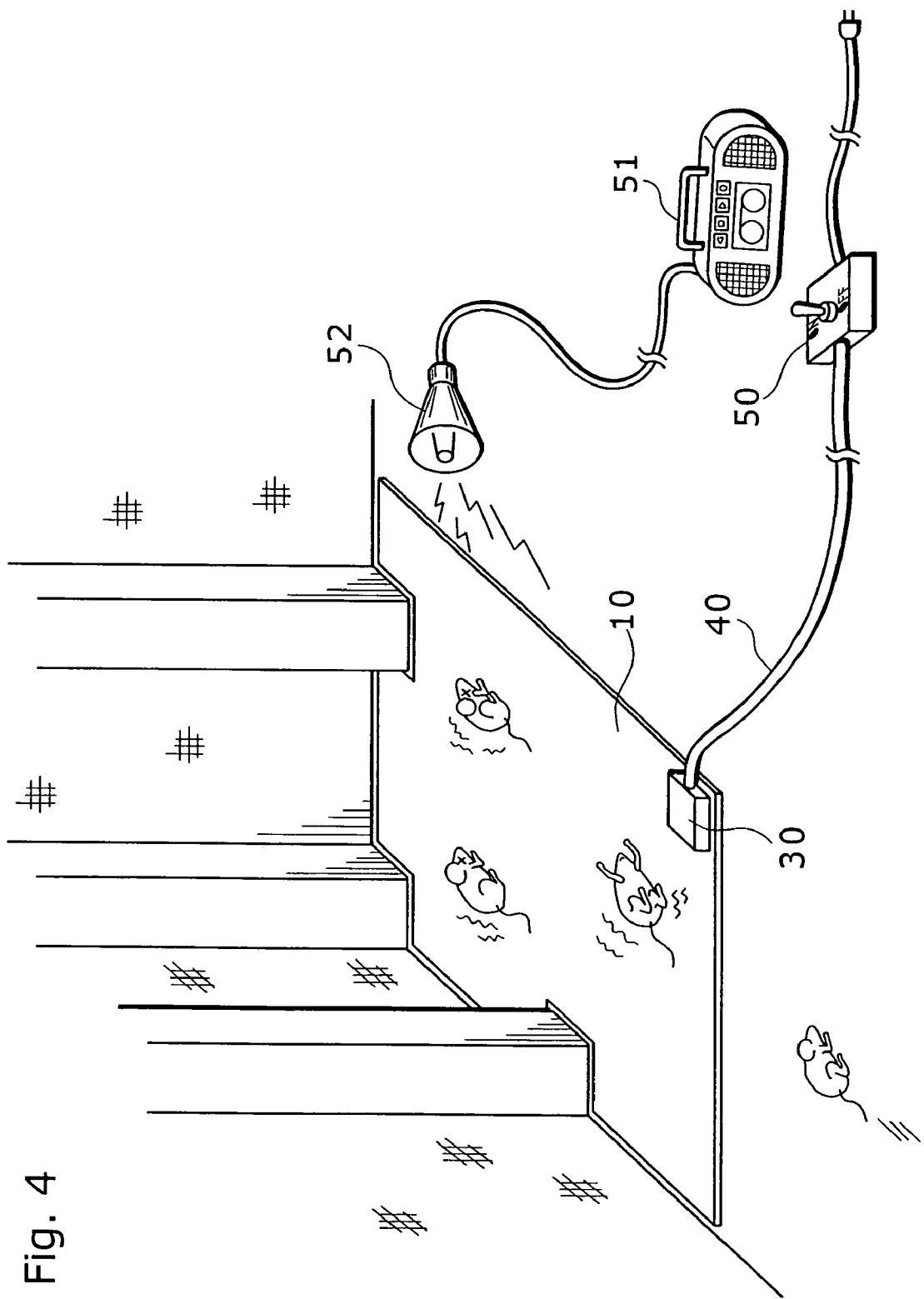
FIG. 4 is an external view of a system for killing rats effectively by electric shock using the sheet for exterminating rats by electric shock 10.

FIG. 4 is an external view of a system for killing rats effectively by electric shock using the sheet for exterminating rats by electric shock 10. This system includes the sheet for exterminating rats by electric shock 10, a high voltage power supply 50, a tape player 51 equipped with an audio tape on which rat's screaming and death crying are prerecorded, and a speaker 52 for making loud the sound generated from the tape player 51.

The sheet for exterminating rats by electric shock 10 and the speaker 52 are placed on the site where rats appear, and the high voltage power supply 50 and the tape player 51 are placed in a remote room where the site can be monitored with a night vision camera or the like. Also, in the remote room, a switch is provided for turning on and off the light of the room where the sheet for exterminating rats by electric shock 10 is laid.

Here, the sheet for exterminating rats by electric shock 10 which is laid on the site is cut out in a particular shape with scissors or the like for fitting it along the shape of the floor of the site where a post or the like juts out.

Also, the high voltage power supply 50, which is comprised of a rectifier circuit, a step-up transformation circuit, a high voltage capacitor, a toggle switch and the like, generates high voltage (DC1000V or the like) by rectifying and stepping up a commercial voltage AC100V and accumulates and holds it in the high voltage capacitor, and further outputs high voltage from the high voltage capacitor to the connector 30 via the power cord 40 when the toggle switch is turned ON. Note that the high voltage and the electric current to be outputted are set to be minimum values enough to stun rats or kill them by electric shock.

Furthermore, as a tape which is set in the tape player 51, a tape on which screams of a target type of a rat are recorded is used from among the tapes on which screams of various types of rats (such as brown rats and black rats) are recorded per type.

Figure 5:
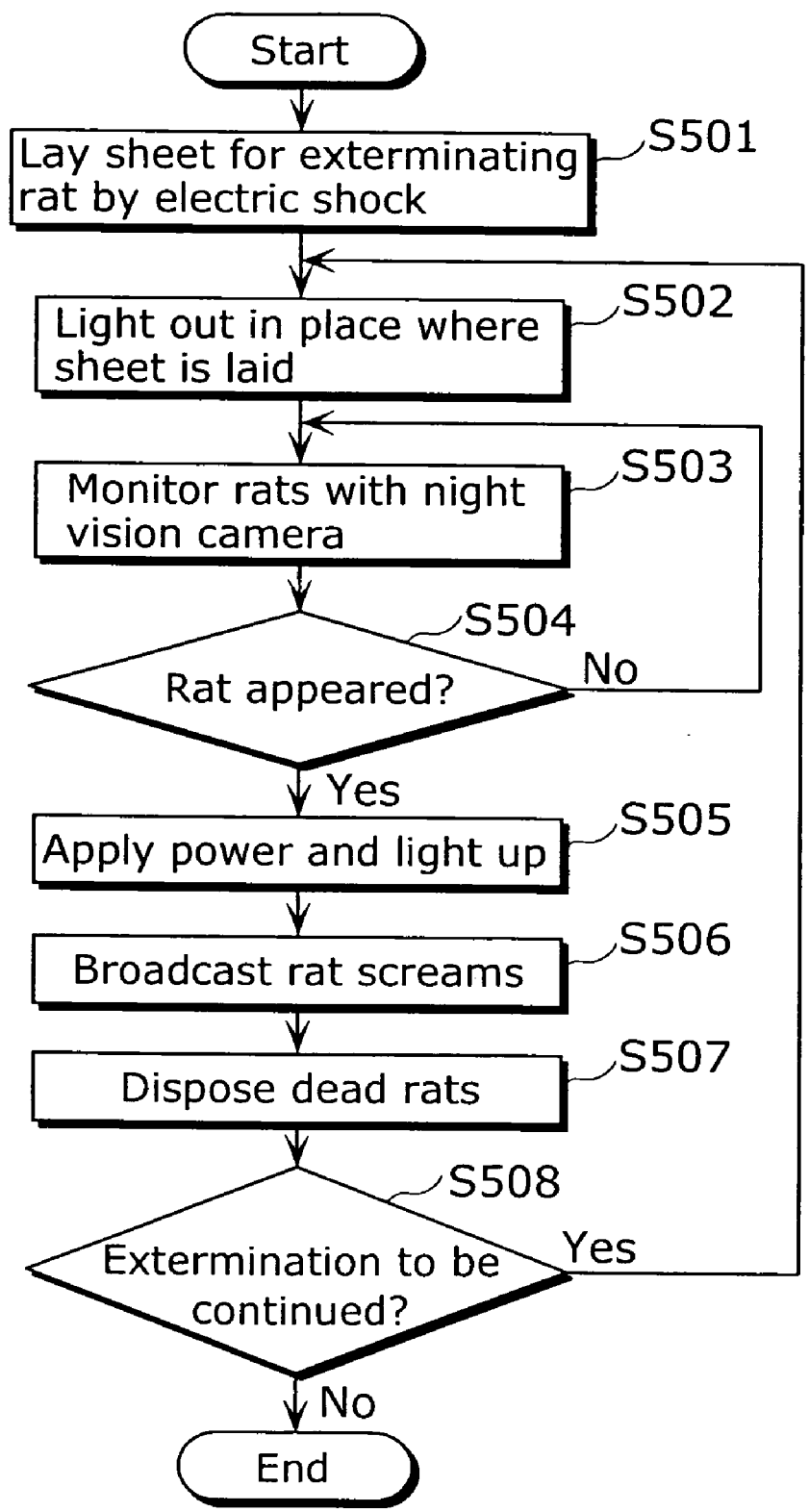
FIG. 5 is a flowchart showing specific operational steps in a case of killing rats by the system for killing rats by electric shock as shown in FIG. 4.

FIG. 5 is a flowchart showing specific operational steps in a case of killing rats by the system for killing rats by electric shock as shown in FIG. 4.

First, the sheet for exterminating rats by electric shock 10 is cut out for the shape of the floor of the room where rats appear frequently and laid there (S501). Other apparatuses 50~52 are also placed at appropriate positions and connected.

Next, the light or the like of the room is turned off to make the room dark (S502), and under the monitoring the site with a night vision camera or the like (S503), appearance of a rat is awaited (S504).

When it is confirmed that a rat appears on or near the sheet for exterminating rats by electric shock 10 (Yes in S504), the toggle switch of the high voltage power supply 50 placed at hand is turned ON to apply high voltage and turn on the light on the site (S505). Next, a split-second later, the tape set in the tape player 51 is played back (S506).

By means of these operations, a rat that exists on the sheet for exterminating rats by electric shock 10 at the moment when the high voltage is applied is instantly killed from an electric shock. Also, a rat that exists around the sheet for exterminating rats by electric shock 10 at that moment gets into a panic at the lighting-up and the screams generated from the speaker 52, and tries desperately to run into its burrow or the like with no time of being aware of its fellow rat's death from an electric shock generated by the sheet for exterminating rats by electric shock 10. Therefore, if the sheet for exterminating rats by electric shock 10 is laid forward of the rat, it tries to run through the sheet for exterminating rats by electric shock 10 straight as an arrow and dies instantly from an electric shock.

Furthermore, even if a rat happens to be able to run away without touching the sheet for exterminating rats by electric shock 10, it cannot learn that the fellow rat has been killed by the sheet for exterminating rats by electric shock 10 but just guesses that the fellow is killed by attack from any other thing unknown, and thus does not avoid this sheet for exterminating rats by electric shock 10.

So, after power distribution to the sheet for exterminating rats by electric shock 10 is stopped by turning the toggle switch of the high voltage power supply 50 OFF at the time when no noise of rats is heard, dead rats on the sheet for exterminating rats by electric shock 10 are disposed by picking up into a plastic bag or the like and burned up (S507).

If the rat extermination is to be continued (Yes in S508), the above operations (S502~S507) are repeated.

As described above, the system for killing rats by electric shock gives rats no time of learning that the sheet for exterminating rats by electric shock 10 is dangerous, so a repeated use thereof does not cause reduction of the extermination effect.

Also, on the sheet for exterminating rats by electric shock 10, high-voltage applied positive and negative electrodes (the convexes coming up from the intermediate sheet 12 and the convexes coming up from the lower sheet 13) are alternately arranged in a dense state, so rats which step on this sheet for exterminating rats by electric shock 10 can be killed by electric shock without fail.

Note that a plurality of convexes 12a and 13a of about 1 mm in diameter are aligned at every spacing of about 2 mm on the sheet for exterminating rats by electric shock 10 in the present embodiment, but these sizes may be selected at appropriate according to the types of rats to be exterminated, the sizes of their limbs and the like. For example, a plurality of types of sheets for exterminating rats by electric shock with various sizes of convexes and alignment spacing may be manufactured in advance for selection of the best one from among them.

Also, predetermined values of the voltage and electric current of the high voltage power supply 50 may be variable, or selectively used from among a plurality of types of the high voltage power supplies manufactured in advance.

Note that in the present embodiment, safety measures are taken so that no human enters the room where the sheet for exterminating rats by electric shock 10 is laid because it involves a risk of generating high voltage, and needless to say, a person with a certain qualification needs to operate it.

(Second Embodiment)

Next, a sheet for exterminating rats by electric shock according to a second embodiment of the present invention will be explained.

Figure 6:
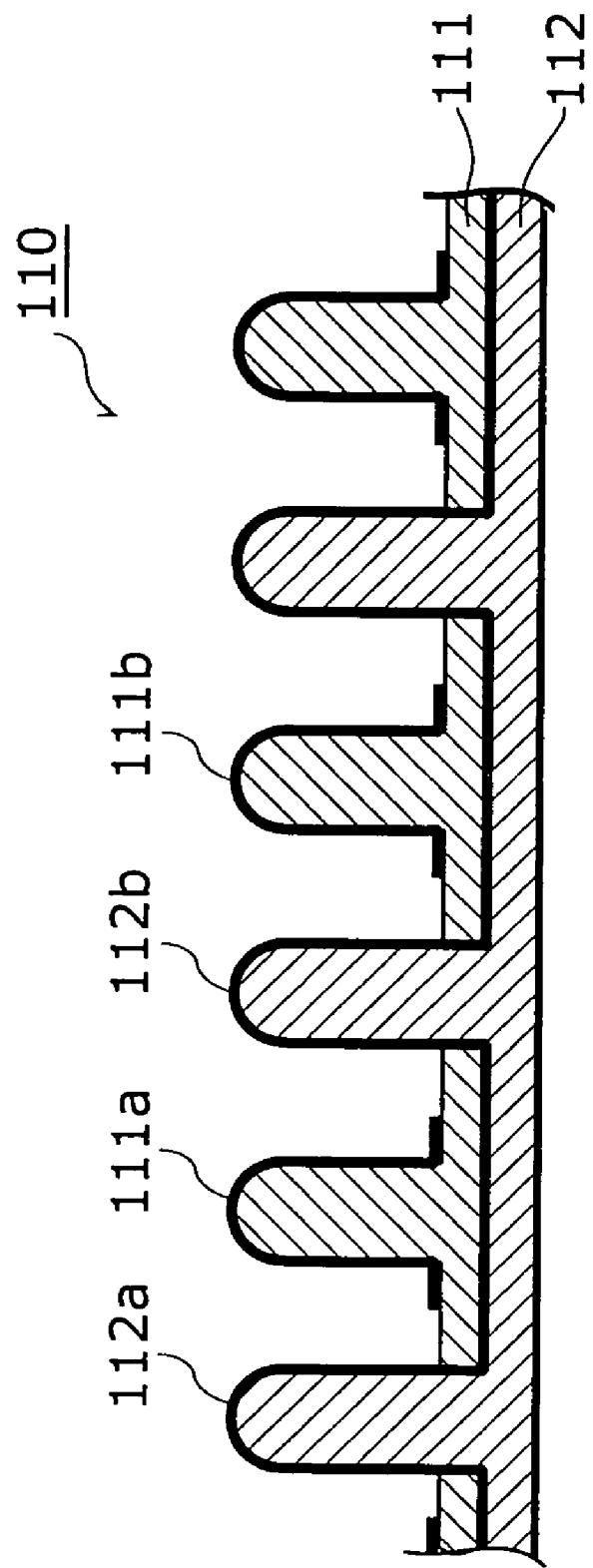
FIG. 6 is a cross sectional view of a sheet for exterminating rats by electric shock 110 in a second embodiment of the present invention.

FIG. 6 is a cross sectional view of a sheet for exterminating rats by electric shock 110 in the present embodiment, and corresponds to FIG. 2 in the first embodiment.

This sheet for exterminating rats by electric shock 110 is a sheet having on the upper surface thereof a plurality of convexes 111a, 112a and others which are densely aligned both vertically and horizontally, and it is same as the first embodiment in that it is a long sheet like piece goods, but different from the first embodiment in that it has a double layer structure (an upper sheet 111 and a lower sheet 112 are layered).

Figure 7:
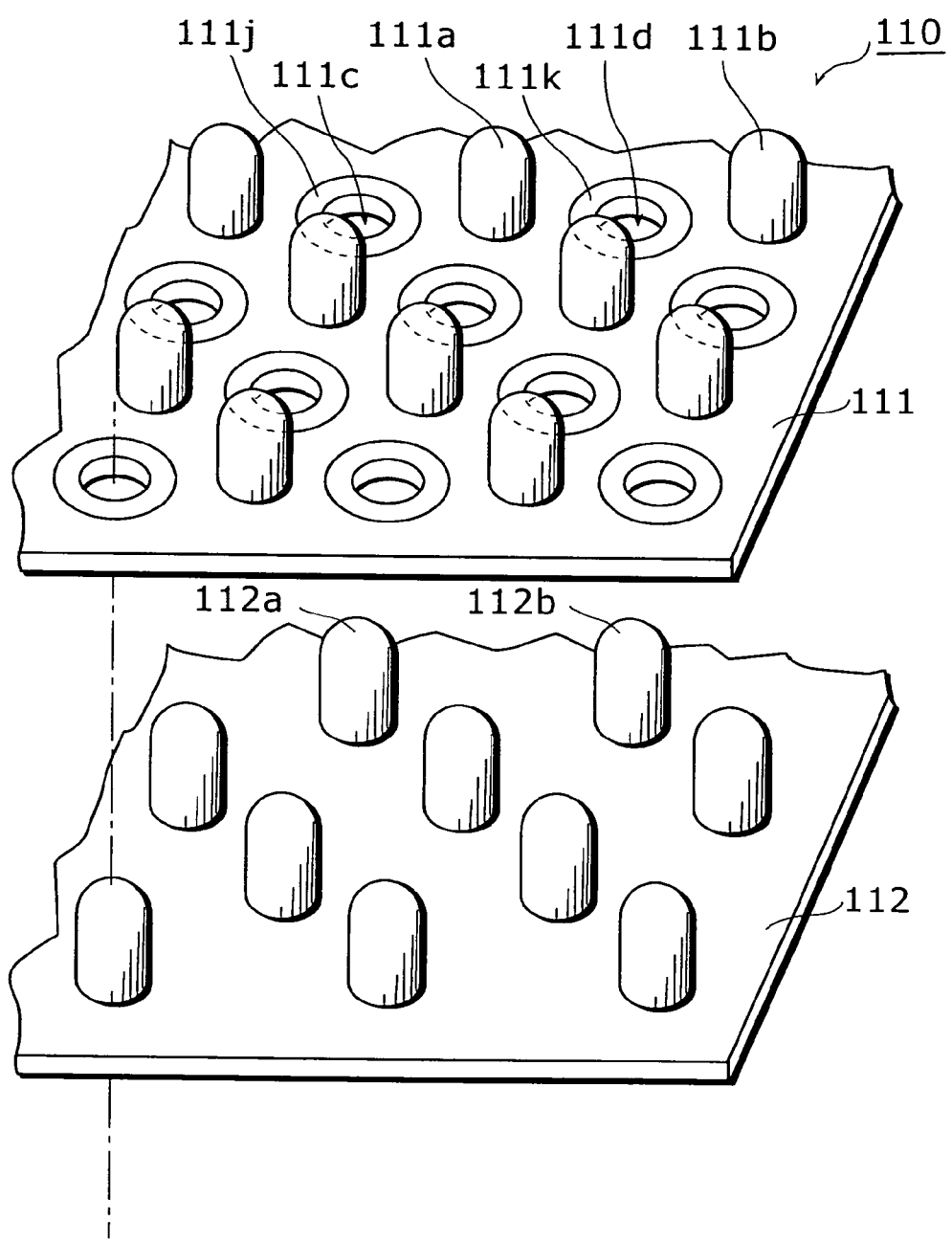
FIG. 7 is a perspective view showing respective shapes of two sheets 111 and 112 that form the sheet for exterminating rats by electric shock 110.

FIG. 7 is a perspective view showing respective shapes of the two sheets 111 and 112 that form the sheet for exterminating rats by electric shock 110, and corresponds to FIG. 3 in the first embodiment.

As shown in these figures, out of the convexes 111a, 112a and others which stand on the upper surface of this sheet for exterminating rats by electric shock 110, the convexes 111a, 111b and others which are alternately aligned both vertically and horizontally are formed integrally with the upper sheet 111, while the convexes 112a and 112b and others which are alternately aligned are formed integrally with the lower sheet 112. In other words, the convexes 112a, 112b formed on the lower sheet 112 stands on the upper surface of the upper sheet 111 through round holes 111c, 111d and others provided on the upper sheet 111.

Both of these two sheets 111 and 112 are made of a film-like thin plastic sheet or the like, and the upper surfaces thereof (the surfaces having the convexes) are covered with conductive metal films, which are same as those in the first embodiment in their electrically conductive state, but different from the first embodiment in that non-conductive areas 111j and 111k are provided on some portions of the upper surface of the upper sheet 111 as shown in FIG. 7.

To be more specific, around the edges of the holes 111c, 111d and others on the upper surface of the upper sheet 111, the doughnut-shaped non-conductive areas 111j and 111k of about 0.5 mm wide are provided. These are provided in order to prevent electrical contact between the metal film formed on the upper surface of the upper sheet 111 and the surface over the convexes 112a, 112b and others coming up from the lower sheet 112.

By providing these non-conductive areas 111j and 111k, this sheet for exterminating rats by electric shock 110 can play the same function as the first embodiment, although it has a simple structure of only two-sheet layer. In other words, these two sheets 111 and 112 (the convexes 111a, 111b and others and the convexes 112a, 112b and others) are insulated from each other, and thus function as two electrodes for applying high voltage on rats.

Note that as for a connector for electrically connecting this sheet for exterminating rats by electric shock 110 and the high voltage power supply, the same one as that in the first embodiment can be used. And using this sheet for exterminating rats by electric shock 110 instead of the sheet for exterminating rats by electric shock 10 in the first embodiment, the same system for killing rats by electric shock as that in the first embodiment can be configured.

Furthermore, the manufacturing method of this sheet for exterminating rats by electric shock 110 is basically same as that in the first embodiment. However, a process of providing the non-conductive areas 111j, 111k and others on some portions of the upper surface of the upper sheet 111 of the present embodiment is added. The process is realized by the method of masking the non-conductive areas on the upper surface of the upper sheet 111 by taping these areas thereof before coating with or printing a metal film thereon, or by the method of stripping off the metal film on these areas only after the metal surface is formed all over the upper surface.

(Third Embodiment)

Next, a sheet for exterminating rats by electric shock according to a third embodiment of the present invention will be explained.

Figure 8:
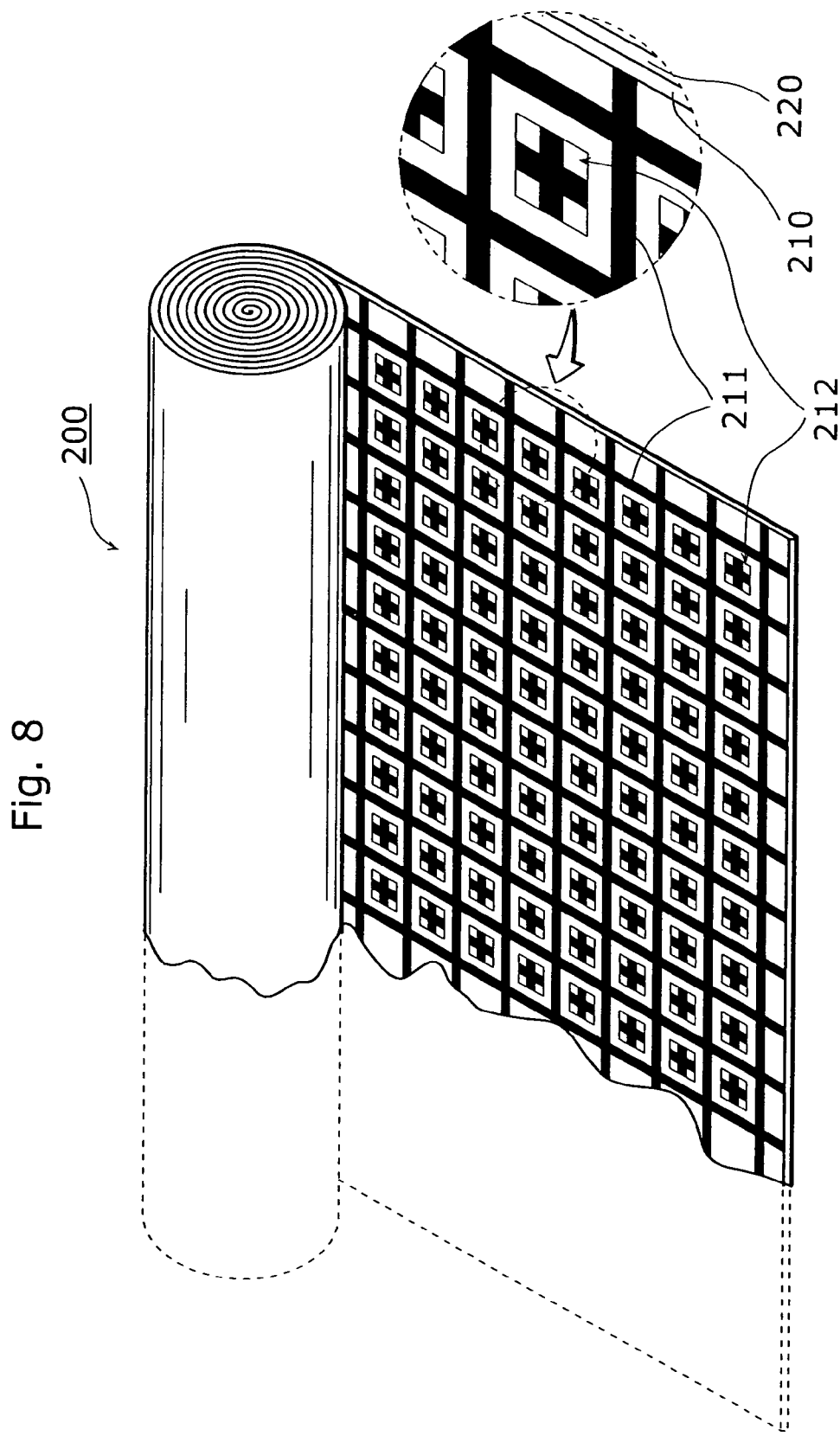
FIG. 8 is an external view of a sheet for exterminating rats by electric shock 200 in a third embodiment of the present invention.

FIG. 8 is an external view of a sheet for exterminating rats by electric shock 200 in the present embodiment.

This sheet for exterminating rats by electric shock 200 is comprised of two thin sheets (an upper sheet 210 and a lower sheet 220) pasted together both having the upper surfaces on which a copper foil grid pattern is formed, and is a long and wide sheet which is same as those in the first and second embodiments.

Figure 9:
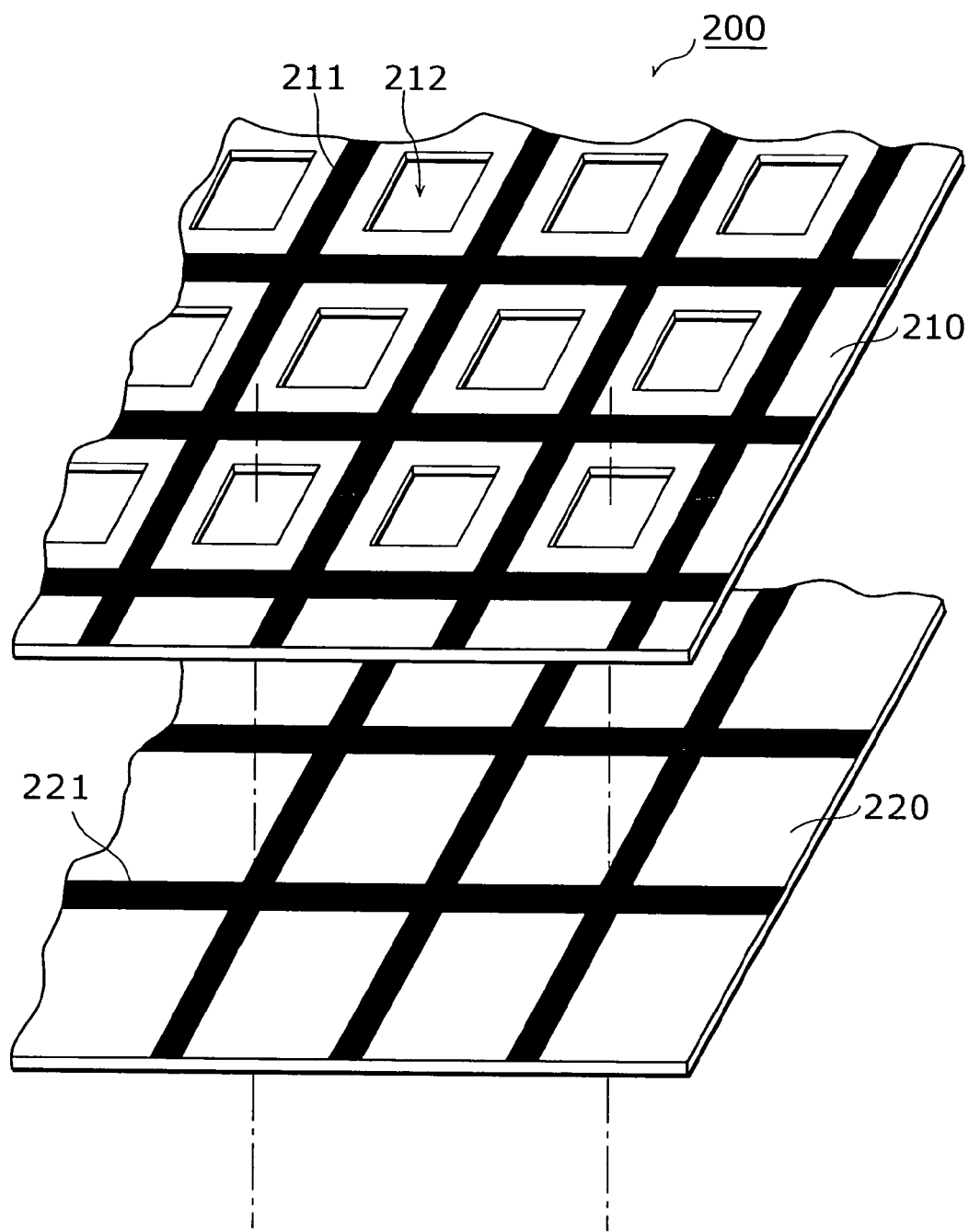
FIG. 9 is a perspective view showing respective shapes of two sheets 210 and 220 that form the sheet for exterminating rats by electric shock 200.

FIG. 9 is a perspective view showing respective shapes of the two sheets 210 and 220 that form this sheet for exterminating rats by electric shock 200.

The upper sheet 210 and the lower sheet 220 are both extremely thin (for example, of 0.2 mm thick) film-like plastic sheets, and copper foil patterns 211 and 221 made up of straight lines of about 2 mm wide intersecting at right angles are formed (printed) on the upper surfaces of the sheets. On the upper surface of the upper sheet 210, rectangular windows 212 are made in areas surrounded by the copper foil pattern 211. These two sheets 210 and 220 are pasted to each other with an adhesive so that the intersecting points of the copper foil pattern 221 on the lower sheet 220 are placed at the centers of the windows 212 on the upper sheet 210. To be more specific, the copper foil pattern 221 on the lower sheet 220 is exposed through the windows 212.

What to do for using this sheet for exterminating rats by electric shock 200 is cut out in an appropriate shape in the same manner as the above first and second embodiments, and connect the power cord 40 leading from the high voltage power supply 50 to the copper foil patterns 211 and 221 of the upper sheet 210 and the lower sheet 220, respectively, by soldering or using a socket or the like, in the same manner as the above first and second embodiments. As a result, high voltage is applied between the upper sheet 210 and the lower sheet 220, and thus a rat, which touches both the copper foil pattern 211 on the upper sheet 210 and the copper foil pattern 221 on the lower sheet 220 which is exposed through the windows 212 at the same time, dies from an electric shock.

As described above, on the upper surface of the sheet for exterminating rats by electric shock 200 in the present embodiment, high voltage positive electrodes and negative electrodes are aligned alternately in the same manner as those in the first and second embodiments. Therefore, as compared with the conventional electric shock paper with parallel electric wires being just pasted on the upper surface thereof, the sheet for exterminating rats by electric shock 200 in the present embodiment can kill rats which step on the sheet with an extremely high probability.

This sheet for exterminating rats by electric shock 200 is manufactured in the following manner. A plastic sheet is prepared, and a copper foil pattern is printed or a copper tape is stuck on the upper surface thereof so as to complete the lower sheet 220. Next, for the lower sheet 220, windows are opened using a cutter or the like on the upper sheet 210 so as to complete it. Finally, these two sheets 210 and 220 are layered so that the intersecting points of the copper foil pattern 221 are placed at the centers of the windows 212 and pasted together with an adhesive.

Both of the two sheets that make up this sheet for exterminating rats by electric shock 200 have a simple tabular structure without convexes, differently from the first and second embodiments. In addition, these two sheets have the copper foils of the same pattern on the insulating sheets thereof, and are manufactured through the common manufacturing processes. Therefore, the sheet for exterminating rats by electric shock 200 in the present embodiment has an advantage of easier manufacturing than those in the first and second embodiments.

(Fourth Embodiment)

Next, a method for repelling bird pests and animal pests according to a fourth embodiment of the present invention will be explained.

The method for repelling bird pests and animal pests according to the present embodiment is a method for repelling bird pests such as pigeons and animal pests such as deer, wild boars and kangaroo by sound. To be more specific, that is a method for repelling pigeons and the like from the sites without killing them in order to prevent pollution of their droppings, scattering trash, noisy cries in the buildings, parks, roads and others, and damages of crops such as fruits and vegetables caused by them.

Figure 10:
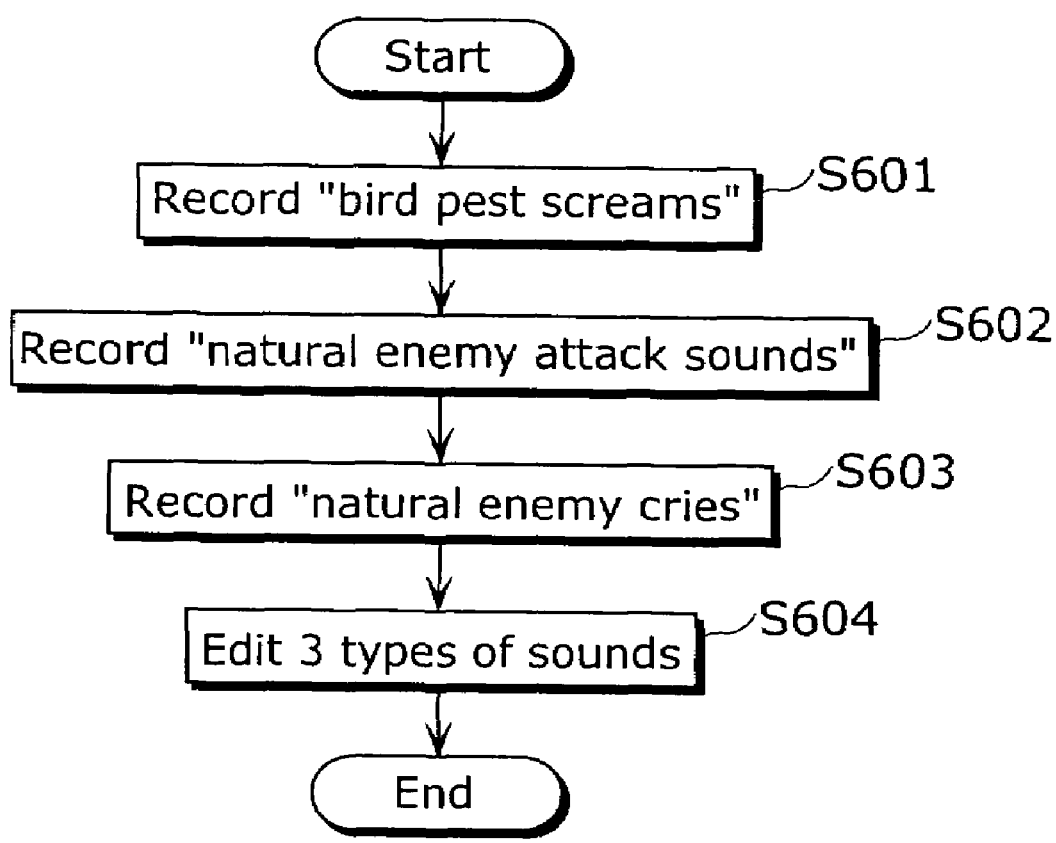
FIG. 10 is a flowchart showing steps of recording sounds used for a method for repelling bird pests and animal pests in a fourth embodiment of the present invention.

FIG. 10 is a flowchart showing steps of recording sounds for that purpose.

First, a target bird pest to be repelled is captured to record its screams and death cries as "bird pest screams" using a tape recorder or the like (S601).

Furthermore, the flying and hunting sounds of the natural enemy of the target bird pest to be repelled are recorded as "natural enemy attack sounds" (S602), and the cries of the natural enemy, its hunting cries and others are recorded as "natural enemy cries" (S603). For example, birds of prey such as eagles, hawks, kites, condors and owls are used as natural enemies of pigeons or the like.

Figure 11:
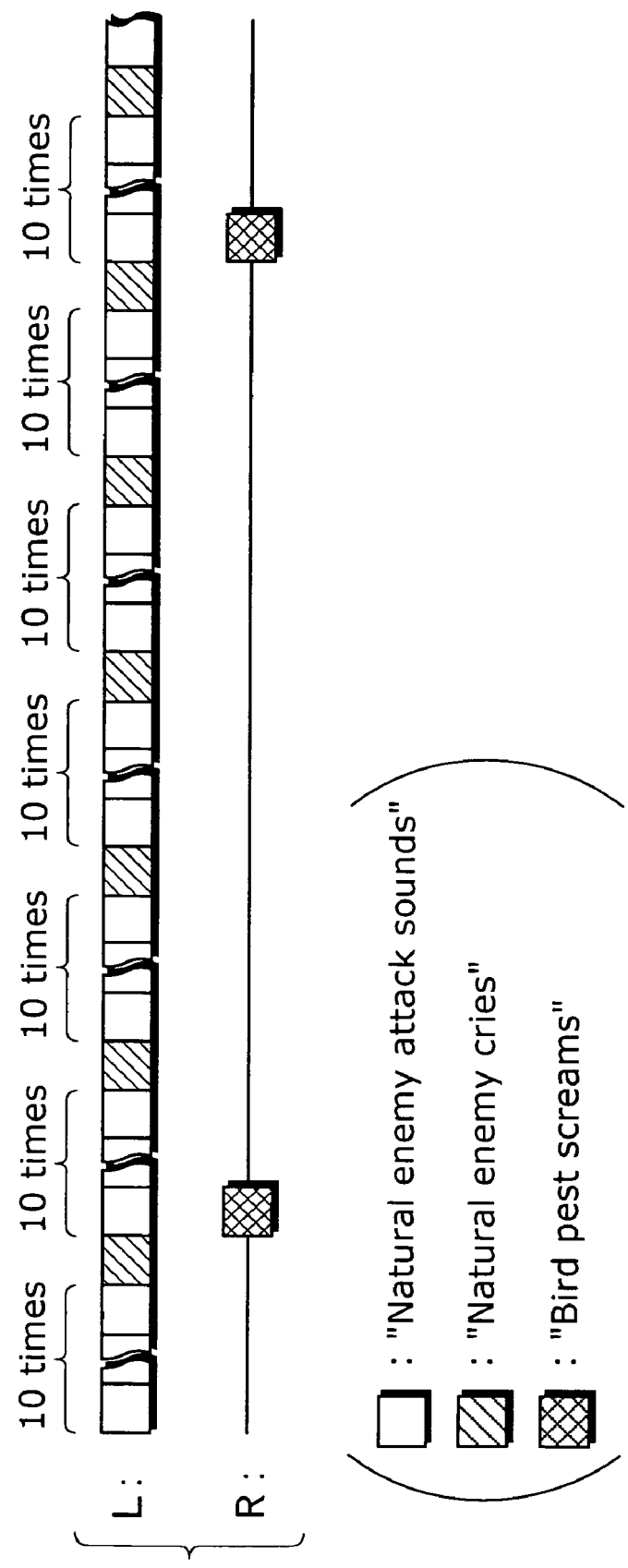
FIG. 11 is a data structure diagram showing what are recorded on a tape.

These three types of sounds and cries are captured into a personal computer as audio data, and edited as a series of stereo sounds structured as shown in FIG. 11 using music editing software or the like. The obtained sounds are outputted to a tape recorder or the like for recording them on one tape (S604).

FIG. 11 is a data structure diagram showing what are recorded on a tape after editing. This figure shows recording positions of three types of sounds and cries to be recorded (one rectangle is an amount of one recording (for example, sounds for about 1 second)) on two tracks (L: left sound track, R: right sound track) that make up one tape.

On the left sound track (L), "natural enemy attack sounds" are recorded again and again, and "natural enemy cries" are inserted at intervals of approximately 10 times of the "natural enemy attack sounds". On the other hand, on the right sound track (R), "bird pest screams" are recorded at certain intervals. They are inserted at intervals of approximately 5 times of the "natural enemy cries".

The resulting sound is a typical example of a combination of cries, screams and sounds emitted from a natural enemy and a bird pest when the bird pest is attacked by its natural enemy, and is an unspeakable, hellish, bad noises that bird pests never want to hear again.

Figure 12:
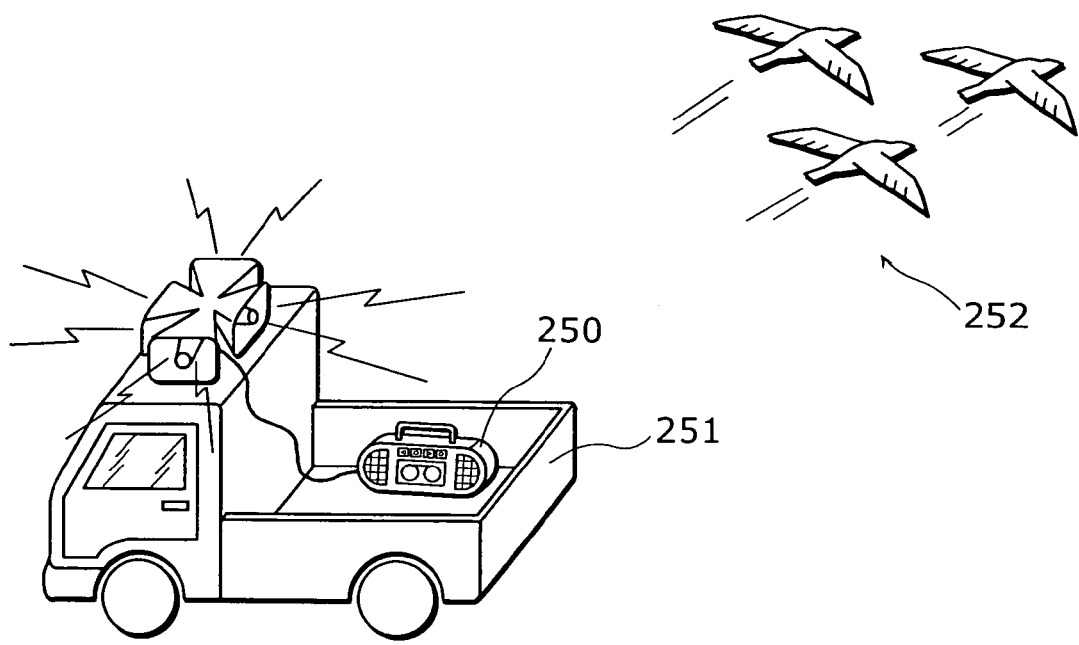
FIG. 12 is a diagram showing how to repel bird pests using a sound-recorded tape as shown in FIG. 11.

FIG. 12 is a diagram showing how to repel bird pests using the tape on which these sounds are recorded. A car 251 on which a tape recorder 250 equipped with a recorded tape is loaded is stopped around the rests, nests or night rests of target bird pests to be repelled in the buildings, parks, roads or the like, and the tape-recorded sounds of the tape recorder 250 are played back at full volume with the precise timing of their gathering to surprise the bird pests 252 to be repelled. And the flying bird pests 252 are chased by the car 251 and the sounds are continued to be played aiming at the bird pests 252, if necessary. As a result, the bird pests can be repelled from the target place effectively.

Note that pigeons have a considerably persistent nature. So, if there is a sign of their return during a watch on how things go there for a few days, it is necessary to play the tape-recorded cries of their natural enemies around that place again.

On the other hand, for animal pests like wild boars, for example, recorded sounds and barks and baying of a lot of dogs hunting wild boars are used as sounds and cries of natural enemies. Also, for deer, recorded barks and baying of dogs or sounds of their running and baying are used. Furthermore, recorded roaring of fierce animals are also used.

In farms and fruit farms, invasion of monkeys or the like is prevented by putting high-voltage applied open electric wires around the farms, and their stepping into the farms is prevented by placing hidden speakers in various positions to play back their natural enemy's cries or the like.

The tape produced as mentioned above can also be used in order to capture wild animals alive in a wide place such as a wilderness, desert, forest area, highland and others to bring them to another place for coexistence, or lead them to a specific place to get rid of them.

Figure 13:
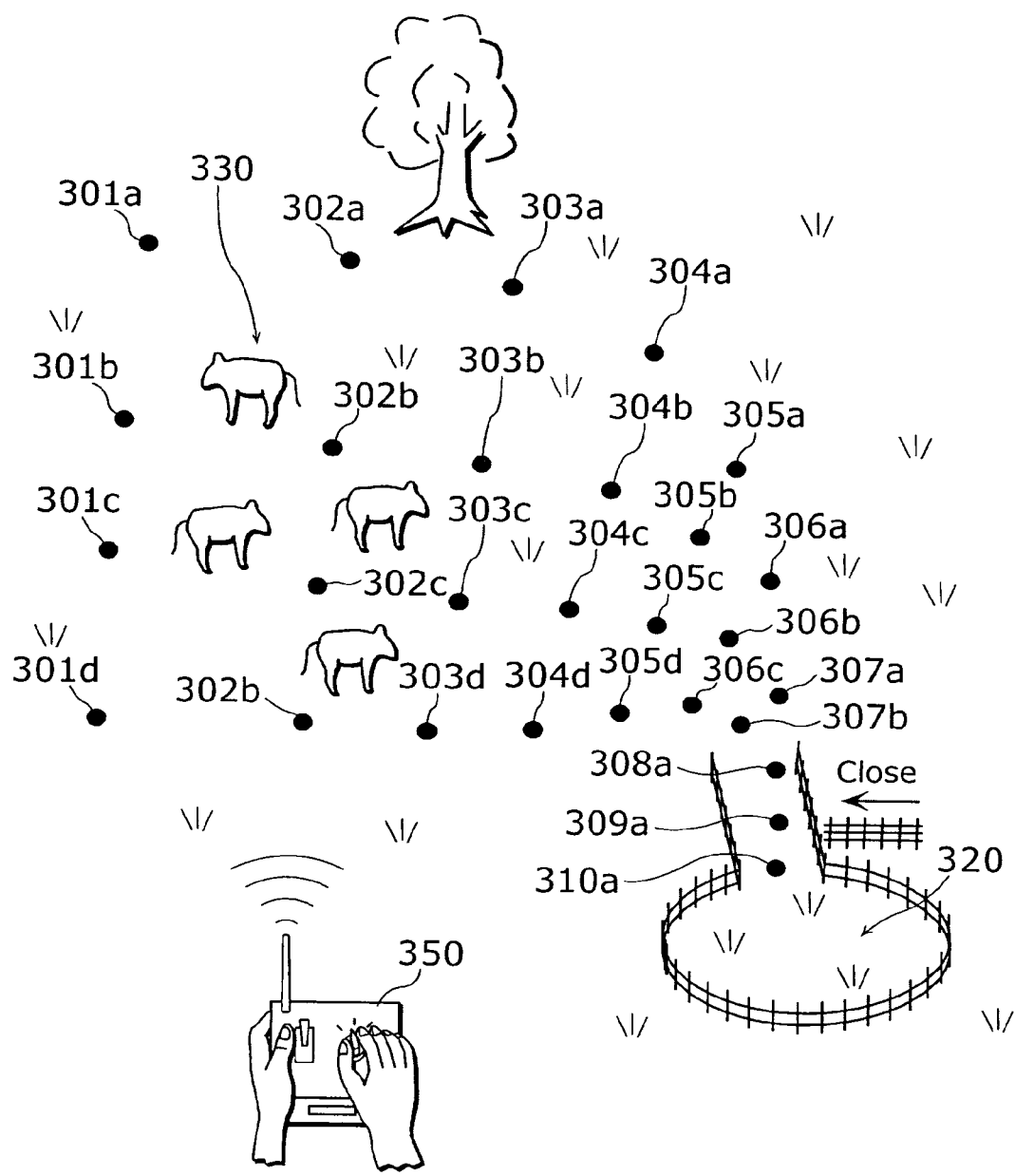
FIG. 13 is a diagram explaining a method for capturing wild animal pests alive by sound.

FIG. 13 is a diagram explaining a method for capturing wild animal pests alive by sound, moving them to a remote place, or leading them to a specific place such as a fenced-up site and a cage, and indicates positions where wireless speakers 301a~d, 302a~d, . . . and 310a are placed in advance in a wilderness or the like.

A capture space 320 is a destination into which animal pests are chased, namely, a site or the like surrounded with a fence having an opening and closing door for an entry. In the wilderness, the wireless speakers 301a~d are placed at a regular spacing at the most distant positions from this capture space, the wireless speakers 302a~d are placed at positions a little closer to the capture space 320 than the distant positions, and as it comes closer to the capture space 320, the wireless speakers 303a~d, the wireless speakers 304a~d, . . . and 310a are placed in sequence.

The wireless speakers 301a~d, 302a~d, . . . and 310a respectively are loudspeakers for receiving radio waves transmitted via certain frequency channels f1, f2, . . . and f10 and demodulating audio signals included in the radio waves for outputting sounds.

Figure 14B:
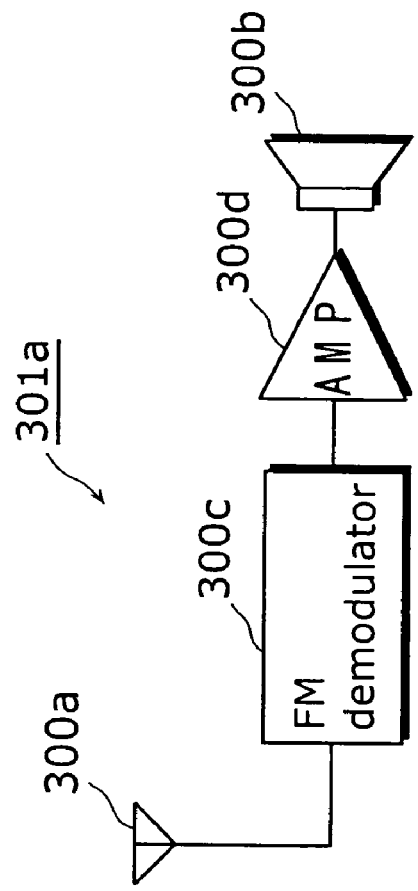
Figure 14A:
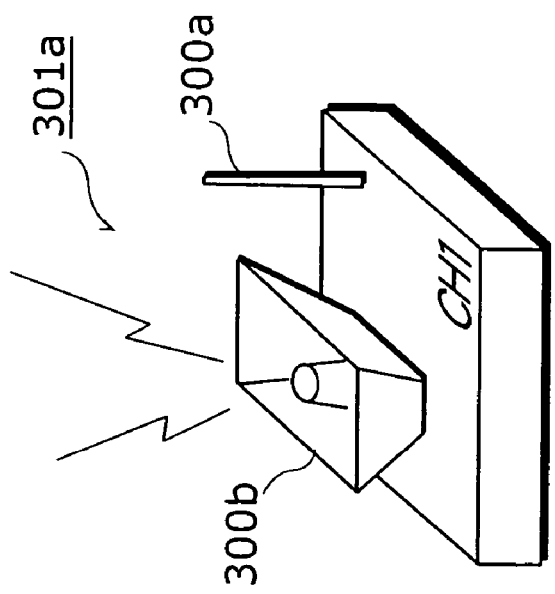

FIG. 14A is an external view of the wireless speaker 301a or the like, and FIG. 14B is a functional block diagram of the wireless speaker 301a or the like. The wireless speaker 301a or the like is a wireless loudspeaker having a closed structure for outdoor use, and is composed of an antenna 300a for receiving radio waves of specific frequency channels, an FM demodulator 300c for performing FM demodulation on the received radio waves to convert them into audio signals, an amplifier 300d for performing power amplification on the demodulated audio signals, and a speaker 300b for outputting the amplified audio signals as sounds. This wireless speaker 301a or the like is driven by an integrated battery or the like, and when receiving a radio wave of a predetermined frequency channel, it amplifies the sounds included in the radio wave for output.

A remote control apparatus 350, which includes an audio tape on which the sounds edited in the above manner are recorded, is a remote controller for performing frequency modulation of the sounds played back from the audio tape at a frequency channel specified by an operator (any one of f1, f2, . . . and f10) and sending them via radio waves. To be more specific, using this remote control apparatus 350, audio signals are sent to a set of wireless speakers belonging to any one of 10 groups of wireless speakers 301a~d, 302a~d, . . . and 310a by remote control, and thus it is possible to make the set of wireless speakers generate sounds.

Figure 15B:
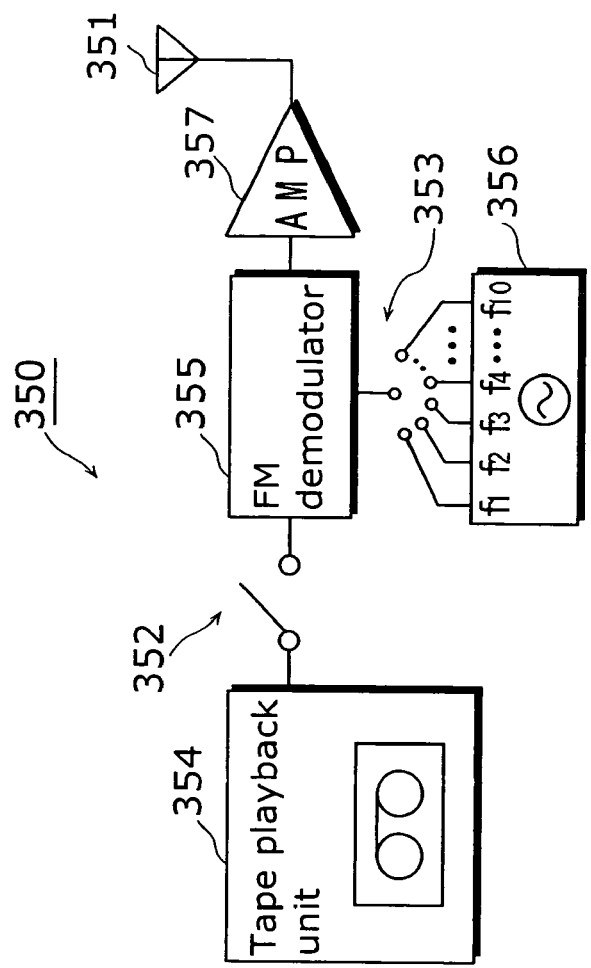
FIG. 15B is a functional block diagram of the remote control apparatus 350.
Figure 15A:
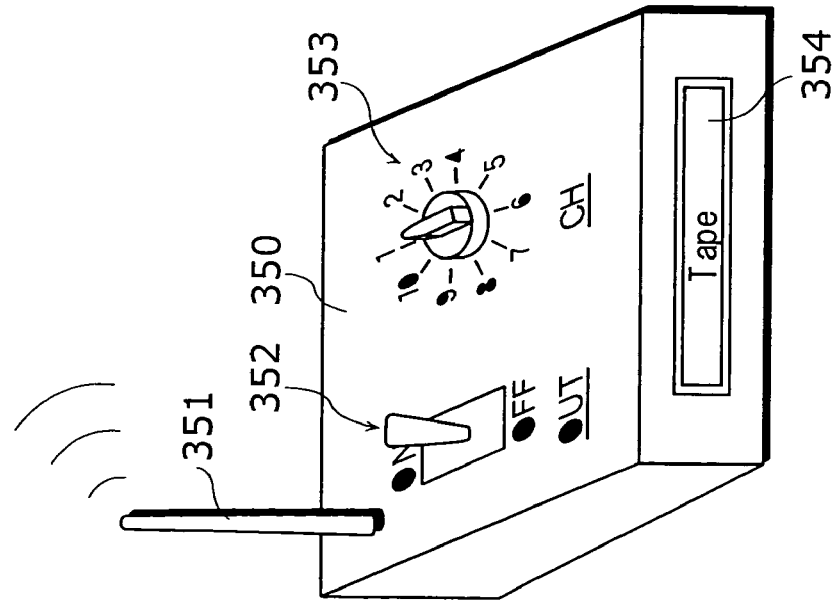
FIG. 15A is an external view of a remote control apparatus 350.

FIG. 15A is an external view of the remote control apparatus 350, and FIG. 15B is a functional block diagram of the remote control apparatus 350. The remote control apparatus 350 includes a tape playback unit 354 for playing back the sounds recorded on the audio tape and outputting them as audio signals, a switch 352 for switching ON/OFF of the audio signals, a transmitter for outputting carrier signals of 10 types of frequencies, a channel switch 353 for selecting one of the carrier signals, an FM demodulator 355 for performing frequency modulation of the selected carrier signal into an audio signal, an amplifier 357 for performing power amplification for the obtained modulated signal, and an antenna 351 for sending the amplified modulated signal as a radio wave.

This remote control apparatus 350 is driven by an integrated battery or the like, and when the switch 352 is ON, it modulates the audio signal obtained from the tape playback unit 354 at the radio wave of the frequency channel selected by the channel switch 354 and sends it.

Now, it is assumed that animal pests to be captured 330 gather in crowds around the positions where the wireless speakers 302a~d belonging to the second group are placed, as shown in FIG. 13. Under such a situation, the channel switch 353 in the remote control apparatus 350 is first set to Channel 1 and turn ON the switch 352. Then, since the above-mentioned "natural enemy attack sounds" and "animal pest screams" are broadcasted from 4 wireless speakers 301a~d belonging to the first group, the animal pests 330 run away in the direction opposite to the sound source.

Next, the channel switch 353 is switched in order of 1, 2, 3, . . . and 10 to chase the running animal pests 330. Thereby, the above-mentioned sounds are broadcasted from the wireless speakers 302a~d, 303a~d, . . . and 310a in sequence from behind the running animal pests 330, and thus they are chased into the capture space 320. Once the animal pests 330 step into the capture space 320, the door of the fence is closed. In this manner, the animal pests 330 can be chased into a target place alive for a wholesale capture.

The sheet for exterminating rats by electric shocks and the methods for repelling bird pests and animal pests according to the present invention have been explained based on the four embodiments, but the present invention is not limited to these embodiments.

For example, in the fourth embodiment, a set of wireless speakers belonging to one group are aligned, but the present invention is not limited to this arrangement, and they may be arranged in a circle, square, or radial pattern. Also, a set of wireless speakers are arranged in a matrix and an arbitrary row and column are specified, and thus animals in a certain area can be guided to an arbitrary place.

Also, in the first~third embodiments, the sheet for exterminating rats by electric shock is laid on the floor of a building or the like, but the place for laying the sheet for exterminating rats by electric shock is not limited to such a plane, but the sheet may be wrapped around a post, a box, a tube, a pipe or the like, or may be put up on a wall or the like by applying an adhesive on the backside of the sheet.

Furthermore, in the above embodiments, a magnetic tape and a tape recorder or the like are used as a recording medium and a playback apparatus for sounds and voices, but the present invention is not limited to these recording medium and playback apparatus, and an MD (Mini Disc) and an MD player or the like may be used, for example.

In addition, the sheet for exterminating rats by electric shock in the first~third embodiments can be applied not only to rats but also to small animals such as weasels and raccoon dogs and foxes, if only the size, spacing or the like of the electrodes provided on the upper surface thereof are adjusted.

INDUSTRIAL APPLICABILITY

As described above, the sheet for exterminating rats by electric shock according to the present invention is useful as a component for exterminating rats, namely, killing or stunning rats by giving them an electric shock using the sheet laid on the building floor or the like together with a high voltage power supply, and the method for repelling bird pests and animal pests according to the present invention is useful as a method for repelling bird pests such as pigeons and animal pests such as wild boars from a target place or chasing them into a target place to capture them alive.

What is claimed is:

1. A sheet for exterminating rats by electric shock, comprising first electrodes and second electrodes for applying high voltage,
   wherein the first electrodes and the second electrodes are alternately arranged in rows both vertically and horizontally in an exposed state on an upper surface of said sheet,
   the sheet for exterminating rats by electric shock has at least two sheets including a first sheet and a second sheet which are layered,
   the first sheet is layered on the second sheet, and has the first electrodes and a plurality of windows formed on an upper surface of said first sheet,
   the second sheet has the second electrodes formed on an upper surface of said second sheet, and
   the first sheet and the second sheet are layered so that the second electrodes are exposed through the windows;
   wherein the first electrodes and the second electrodes are metallic foils printed on the upper surfaces of the first sheet and the second sheet, the metallic foils having a grid of straight lines with a fixed width intersecting at right angles, and
   intersecting points in the metallic foil pattern of the second electrodes are exposed through the windows.

2. The sheet for exterminating rats by electric shock according to claim 1,
   wherein the first electrodes and the second electrodes respectively are a plurality of convexes that stand upward on the upper surfaces of the first sheet and the second sheet, and
   the second electrodes stand on the upper surface of the first sheet through the winders.

3. The sheet for exterminating rats by electric shock according to claim 2, further having a third sheet layered on the first sheet,
   wherein a plurality of windows are formed on an upper surface of the third sheet, and
   the first electrodes and the second electrodes stand upward on the third sheet through the windows of said third sheet.

4. A system for killing rats by electric shock, comprising:
   the sheet for exterminating rats by electric shock according to claim 1;
   a high voltage power source for generating high voltage; and
   a connector for applying the high voltage to the first electrodes and the second electrodes of the sheet for exterminating rats by electric shock.

5. The system for killing rats by electric shock according to claim 4,
   wherein the connector has sockets as female electrodes for engaging with the convexes of the first electrodes and the second electrodes as male electrodes.

6. A method for killing rats by electric shock, comprising the following:
   when a rat appears while waiting for appearance of the rat under a light-out condition in a room equipped with a lighting apparatus where the sheet for exterminating rats by electric shock according to claim 1 is laid and a speaker is placed,
   (i) applying high voltage between the first electrodes and the second electrodes of the sheet for exterminating rats by electric shock;
   (ii) turning on the light apparatus; and
   (iii) generating screams of a rat from a speaker by playing back a prerecorded recording medium using a playback apparatus.

* * * * *